(12) United States Patent
Mian et al.

(10) Patent No.: US 7,208,733 B2
(45) Date of Patent: Apr. 24, 2007

(54) NON-VISIBLE RADIATION IMAGING AND INSPECTION

(75) Inventors: Zahid F. Mian, Loudonville, NY (US); Jeremy C. Mullaney, Troy, NY (US); Ryk E. Spoor, Troy, NY (US)

(73) Assignee: International Electronic Machines Corp., Albany, NY (US)

( * ) Notice: Subject to any disclaimer, the term of this patent is extended or adjusted under 35 U.S.C. 154(b) by 106 days.

(21) Appl. No.: 11/121,827

(22) Filed: May 4, 2005

(65) Prior Publication Data

US 2006/0043296 A1 Mar. 2, 2006

Related U.S. Application Data

(60) Provisional application No. 60/603,548, filed on Aug. 24, 2004.

(51) Int. Cl.
*G01J 5/00* (2006.01)
(52) U.S. Cl. .................................................. 250/330
(58) Field of Classification Search ................ 250/330; 378/63
See application file for complete search history.

(56) References Cited

U.S. PATENT DOCUMENTS

| | | | | |
|---|---|---|---|---|
| 4,739,480 A * | 4/1988 | Oono et al. | ................. | 250/584 |
| 5,637,871 A * | 6/1997 | Piety et al. | ................. | 250/330 |
| 5,677,532 A * | 10/1997 | Duncan et al. | ......... | 250/339.15 |
| 5,937,077 A * | 8/1999 | Chan et al. | ................. | 382/100 |
| 6,166,384 A * | 12/2000 | Dentinger et al. | ..... | 250/370.09 |
| 6,473,489 B2 * | 10/2002 | Bani-Hashemi et al. | ...... | 378/63 |
| 6,646,799 B1 * | 11/2003 | Korniski et al. | ............ | 359/407 |
| 6,766,067 B2 | 7/2004 | Freeman et al. | | |
| 2002/0153485 A1 * | 10/2002 | Nixon et al. | ................ | 250/330 |

OTHER PUBLICATIONS

Lou et al., "Data Fusion and Sensor Integration: State-of-the-Art 1990s," Data Fusion in Robotics and Machine Intelligence, M.A. Abidi and R. C. Gonzalez, eds., Academic Press, Inc., pp. 7-135, 1992.
A. Elfes, "Multi-Source Spatial Data Fusion Using Bayesian Reasoning," Data Fusion in Robotics and Machine Intelligence, M. A. Abidi and R. C. Gonzalez, eds., Academic Press, Inc., pp. 137-163, 1992.
Richardson et al., "Fusion of Multisensor Data," Multisensor Integration and Fusion for Intelligent Machines and Systems, Ablex Publishing Corporation, Norwood, NJ, pp. 183-216, 1995.

* cited by examiner

*Primary Examiner*—Constantine Hannaher
(74) *Attorney, Agent, or Firm*—Hoffman, Warnick & D'Alessandro LLC

(57) ABSTRACT

A non-visible radiation imaging system is provided in which an image is obtained based on non-visible radiation of an object. The image can be enhanced to increase its resolution. Additionally, the image can be combined with another image based on visible light for the object. Further, a non-visible radiation inspection system and method are provided that perform an inspection of the object using one or more of the images.

23 Claims, 7 Drawing Sheets

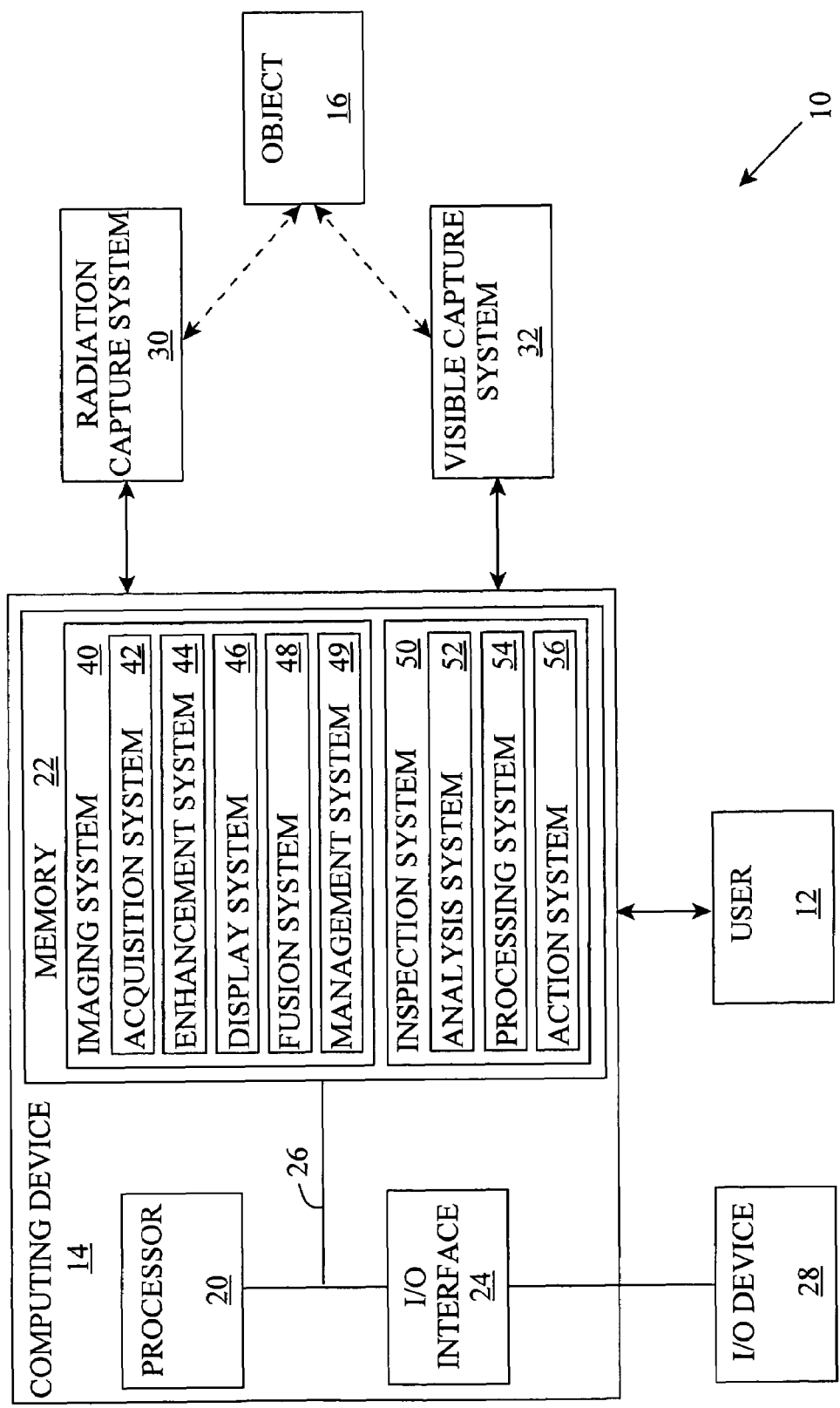

FIG. 2A
FIG. 2B
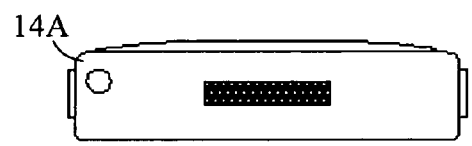
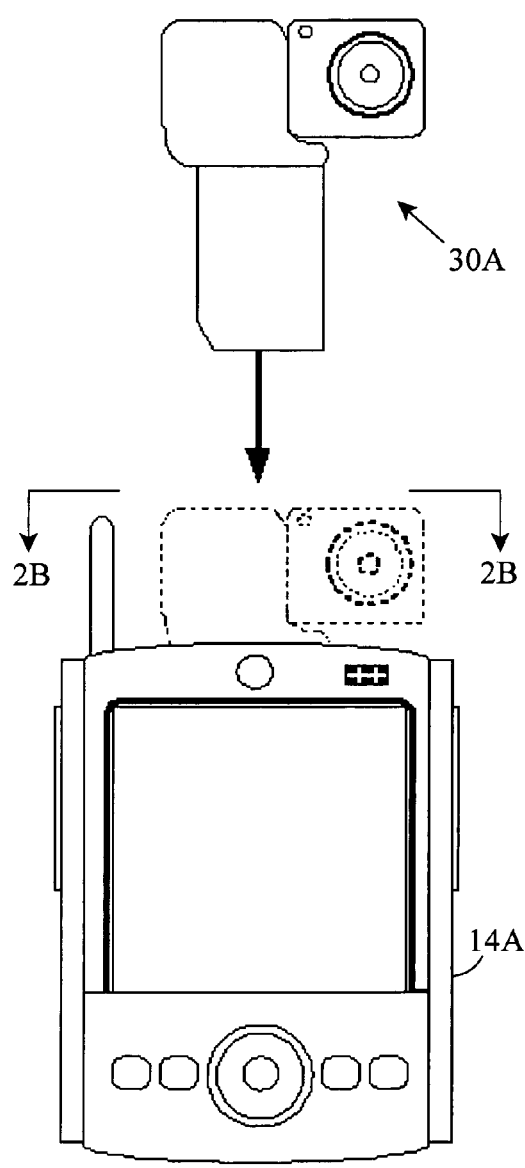

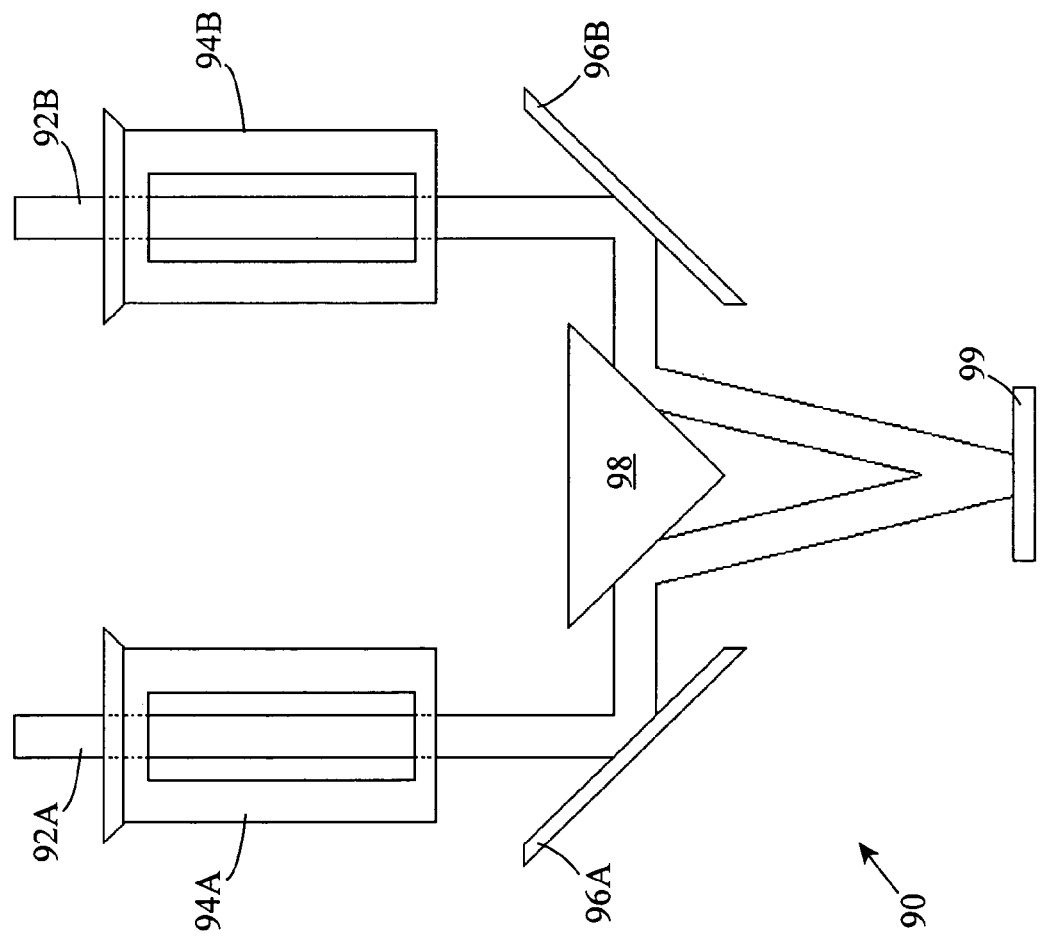

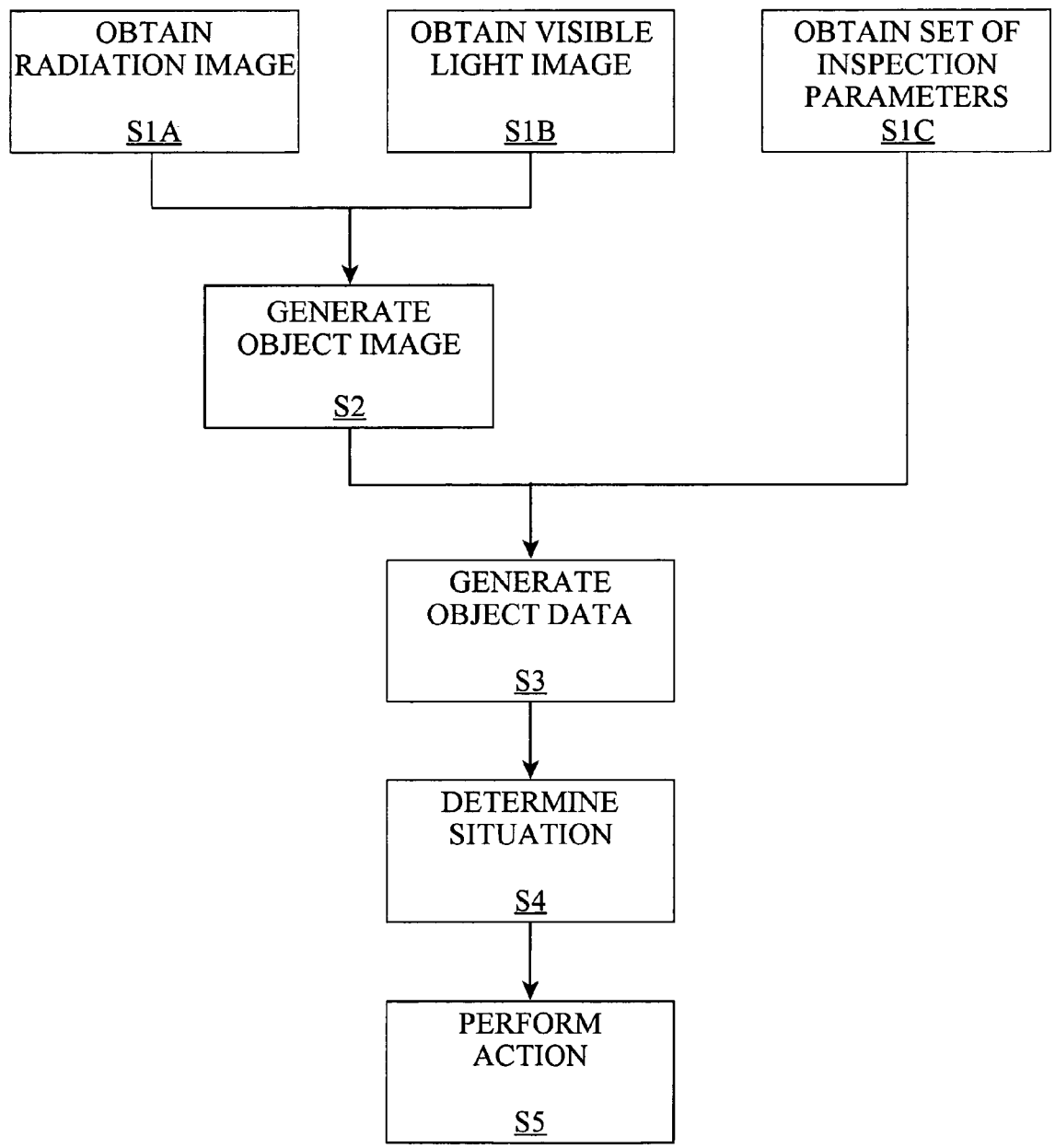

NON-VISIBLE RADIATION IMAGING AND INSPECTION

REFERENCE TO PRIOR APPLICATION

The current application claims the benefit of co-pending U.S. Provisional Application No. 60/603,548, filed on Aug. 24, 2004, which is hereby incorporated herein by reference.

BACKGROUND OF THE INVENTION

1. Technical Field

The invention relates generally to imaging non-visible radiation and/or visible light for an object, and to performing an inspection of the object using the non-visible radiation and/or visible light image(s).

2. Background Art

Numerous imaging devices exist for generating images of objects based on electromagnetic radiation in the visible light spectral band. However, additional information on one or more attributes of many objects can be obtained from imaging electromagnetic radiation having wavelengths that fall above and/or below visible light. For example, infrared light (e.g., thermal radiation) can be imaged to determine the temperature characteristics of the object. Other radiation spectra having non-visible wavelengths that may provide useful information include ultraviolet light, X-rays, radio waves, and the like.

To date, three major technologies are used to detect and/or measure infrared light. A bolometer, which includes an extremely fine wire in an electrical circuit, can measure temperature based on a change in conductance in the wire. When only a particular spectrum of radiation, such as infrared light, is permitted to reach the bolometer, the radiation can be measured. Similarly, a pyroelectric device can measure radiation by exposing a particular type of crystal to a particular spectrum of radiation. Finally, a thermopile, which includes numerous thermocouple elements, can measure radiation based on temperature changes for each element.

Each technology has been used to create an imaging device for infrared light. In particular, a two-dimensional matrix of a selected detection technology can be combined with proper optics to generate a two-dimensional image of radiation in the infrared spectrum. A similar matrix design is used in modern digital cameras for generating visible light images. However, to date, infrared imaging solutions have lagged in both resolution and cost as compared to visible light imaging solutions. As a result, only small resolution infrared imaging systems, e.g., a four-by-four thermopile array, are available for a low price (e.g., less than a few hundred dollars). However, these imaging systems have an insufficient resolution for many applications.

To date, numerous solutions have been proposed that seek to obtain additional resolution from low-resolution images, particularly visible light images. These solutions include a one-pass super-resolution solution, a simple cubic or bilinear resampling, and the like. A more complex solution comprises a longer-term super-resolution approach that attempts to extract data through complex averaging methods from multiple low-resolution images.

Additional information on an object can also be obtained by fusing two or more images. Image fusion combines images from one or more sensing modalities, e.g., infrared light and visible light, into a single presentation that retains the useful and unique information from both modalities. Properly done, an image fusion presentation can be synergistic. That is, the fused presentation allows the viewer to comprehend more of the totality of the object being imaged.

As a result, a need exists for an improved imaging and/or inspection solution that can incorporate imaging of non-visible radiation (e.g., infrared light) in a cost-effective manner. In particular, a need exists for an imaging system and an inspection system and method that generate and use an image based on non-visible radiation of the object.

SUMMARY OF THE INVENTION

The invention provides a non-visible radiation imaging system. Specifically, under the present invention, one or more images of an object can be obtained based on non-visible radiation of the object. Additionally, one or more visible light images can be obtained for the object. In the latter case, an object image can be generated based on the non-visible radiation image(s) and the visible light image(s). In any event, the non-visible radiation image(s) can have a low resolution that is enhanced to increase the amount of resolution for the radiation image. The visible light image(s) and/or other data on the object can be used to generate the enhanced image. As a result, a lower resolution, and therefore lower cost, non-visible radiation imaging system can be used to obtain the desired imaging resolution.

The invention also provides a non-visible radiation inspection system and method. In particular, one or more of the images discussed above can be used to examine/monitor one or more characteristics of the object. The images can be presented for review by a user and/or analyzed to determine a situation. In either case, the analysis can use object data that is obtained from the user and/or the processing of one or more of the images. In addition, one or more actions can be automatically performed based on the analysis. As a result, an inspection of the object can be performed that incorporates the use of one or more images based on non-visible radiation.

A first aspect of the invention provides a non-visible radiation imaging system comprising: means for obtaining a radiation image of an object based on non-visible radiation of the object; means for generating an enhanced image based on the radiation image, wherein the enhanced image has a higher resolution than the radiation image; and means for displaying at least one of the radiation image or the enhanced image.

A second aspect of the invention provides a handheld imaging system comprising: means for obtaining an infrared light image of an object; means for obtaining a visible light image of the object; means for displaying an object image based on at least one of the infrared light image or the visible light image; and means for managing at least one of the infrared light image, the visible light image or the object image.

A third aspect of the invention provides a non-visible radiation inspection system comprising: means for obtaining a radiation image of an object being inspected based on non-visible radiation of the object; means for generating an enhanced image based on the radiation image, wherein the enhanced image has a higher resolution than the radiation image; and means for determining a situation based on the radiation image and a set of inspection parameters.

A fourth aspect of the invention provides a method of inspecting an object, the method comprising: obtaining a radiation image of the object based on non-visible radiation of the object; obtaining a visible light image of the object; generating an object image based on the radiation image and the visible light image; and performing the inspection based on the object image and a set of inspection parameters.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIG. 1 shows an illustrative system for performing an inspection of an object;

FIGS. 2A–B show alternative views of an illustrative personal digital assistant (PDA) and sensor head according to one embodiment of the invention;

FIG. 6 shows an illustrative optical system for generating an object image based on two independent electromagnetic radiation beams; and FIG. 7 shows illustrative method steps for inspecting an object according to one embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 3:
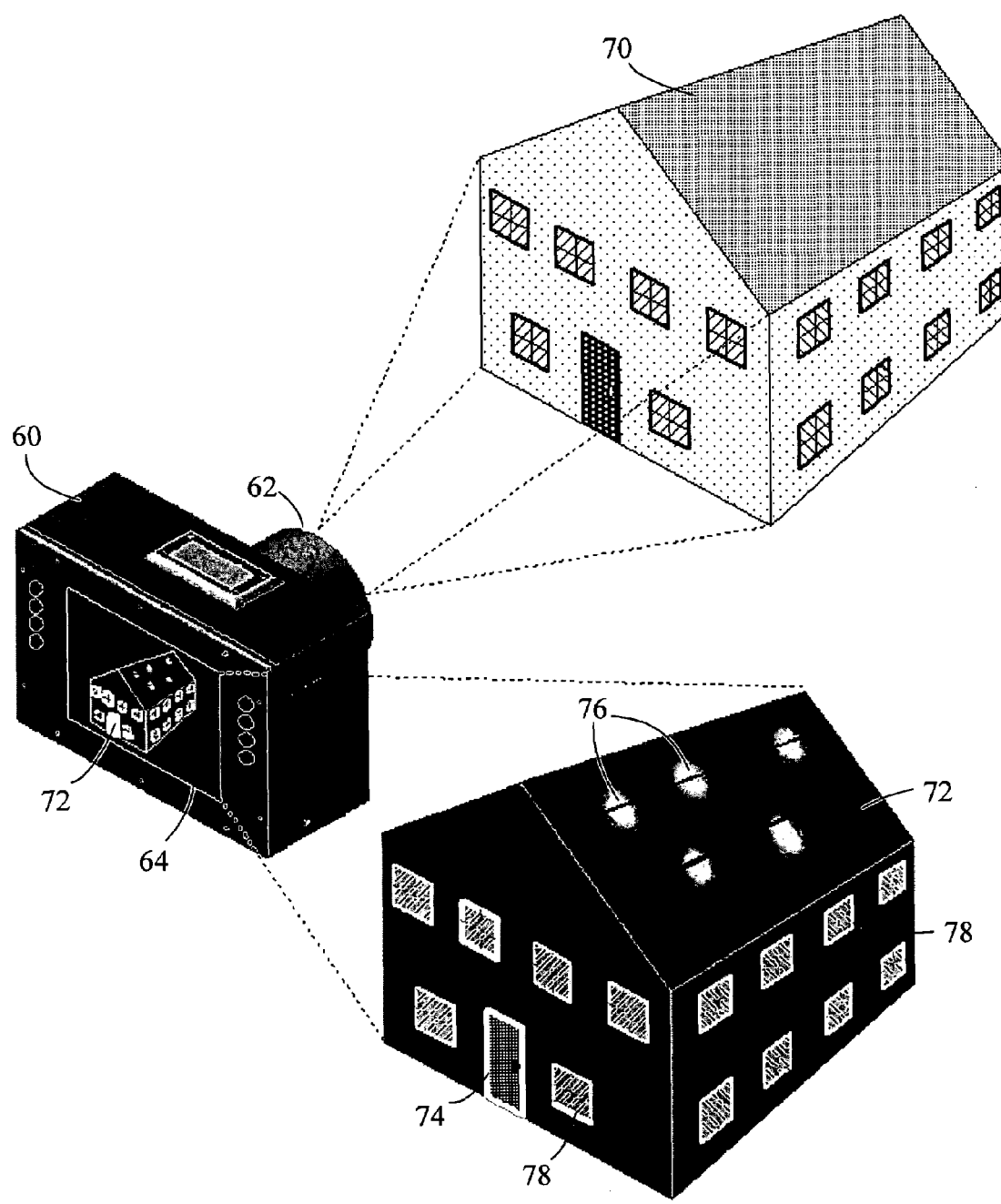
FIG. 3 shows an illustrative handheld non-visible radiation imaging system according to one embodiment of the invention.

As indicated above, the invention provides a non-visible radiation imaging system. Specifically, under the present invention, one or more images of an object can be obtained based on non-visible radiation of the object. Additionally, one or more visible light images can be obtained for the object. In the latter case, an object image can be generated based on the non-visible radiation image(s) and the visible light image(s). In any event, the non-visible radiation image(s) can have a low resolution that is enhanced to increase the amount of resolution for the radiation image. The visible light image(s) and/or other data on the object can be used to generate the enhanced image. As a result, a lower resolution, and therefore lower cost, non-visible radiation imaging system can be used to obtain the desired imaging resolution.

The invention also provides a non-visible radiation inspection system and method. In particular, one or more of the images discussed above can be used to examine/monitor one or more characteristics of the object. The images can be presented for review by a user and/or analyzed to determine a situation. In either case, the analysis can use object data that is obtained from the user and/or the processing of one or more of the images. In addition, one or more actions can be automatically performed based on the analysis. As a result, an inspection of the object can be performed that incorporates the use of one or more images based on non-visible radiation.

Turning to the drawings, FIG. 1 shows an illustrative system 10 for performing an inspection on an object 16. As used herein, object 16 is used to represent anything capable of being imaged. To this extent, object 16 can comprise a single physical item (e.g., a human), a physical item made of a plurality of physical items (e.g., a house), a plurality of physical items (e.g., automobiles in a parking lot), and the like. Further, object 16 can comprise an area that may include one or more physical items, such as the perimeter of a property. As a result, the term "object" does not limit the invention to any particular type of inspection and/or imaging application.

System 10 includes an imaging system 40 that can obtain and manage one or more images of object 16 from radiation capture system 30 and/or visible capture system 32. Radiation capture system 30 obtains radiation image(s) of object 16 based on non-visible radiation of object 16. In one embodiment, the non-visible radiation comprises infrared light (e.g., thermal radiation). However, it is understood that a radiation image can be obtained for other types of non-visible electromagnetic radiation, including ultraviolet light, X-rays, radio waves, gamma rays, electric waves, microwaves, and the like. Visible capture system 32 obtains visible light image(s) of object 16 that are based on electromagnetic radiation having frequencies within the visible light spectrum (i.e., visible light) for object 16. To this extent, visible capture system 32 can comprise any type of visible light sensing device for imaging object 16.

In any event, inspection system 50 can perform an inspection of object 16 based on the radiation image(s) and/or visible light image(s). As used herein, the term "inspection" means any type of examination/monitoring of object 16 that seeks to obtain information on object 16 for any purpose. For example, an "inspection" can comprise an examination of a building for energy efficiency, water damage, structural characteristics, or the like; examination of an electrical system for overheating due to shorts or other defects; examination of a mechanical system for heating due to wear, misalignment, lubrication failure, or the like; monitoring of a process involving heat, such as the firing and cooling of ceramics, casting of metals, forging of metal objects, etc.; detection of a living creature, operating/recently operated machinery for purposes of security, search and rescue, and the like; detection of a fire, such as a hydrogen fire, alcohol fire, embers, or the like, that is difficult to perceive; detection of corona discharge; etc.

Imaging system 40 and inspection system 50 are each shown implemented on computing device 14 as a program product. However, it is understood that some or all of the functionality described for imaging system 40 and/or inspection system 50 could be implemented as hardware and/or firmware. Regardless, radiation capture system 30 and/or visible capture system 32 can comprise one or more digital sensing devices that obtain image(s) in the form of digital data based on the non-visible radiation and/or visible light for object 16. In this case, radiation capture system 30 and/or visible capture system 32 can provide the image(s) to imaging system 40 and/or inspection system 50 in a format that can be readily processed by either system. In one embodiment, radiation capture system 30 and/or visible capture system 32 can utilize a line/group scanning approach to generate the corresponding image, rather than the typical gestalt approach commonly incorporated in imaging devices.

In any event, computing device 14 can comprise any type of computing system capable of being operated by user 12 and/or communicating with one or more other computing systems. In one embodiment, computing device 14, radiation capture system 30 and/or visible capture system 32 are implemented as a unitary handheld imaging system as shown and discussed further below. Alternatively, computing device 14 can comprise a standard computing system such as a desktop/laptop computing system, a personal digital assistant (PDA), a palmtop, a multi-function mobile telephone, etc., that is capable of being programmed with and executing one or more program products, such as imaging system 40 and/or inspection system 50. In this case, radiation capture system 30 and/or visible capture system 32 can be implemented as a separate physical system that communicates with computing device 14 via a standard communications technology.

To this extent, computing device 14 is shown including a processor 20, a memory 22, an input/output (I/O) interface 24, a bus 26, and an I/O device 28. In general, processor 20 executes computer program code, such as imaging system 40, that is stored in memory 22. While executing the computer program code, processor 20 can read and/or write data (e.g., image(s) of object 16) to/from memory 22 and/or I/O interface 24. Bus 26 provides a communications link between each of the components in computing device 14, while I/O device 28 provides a communications link between computing device 14 and user 12, radiation capture system 30, and/or visible capture system 32.

Computing device 14 is only illustrative of various possible combinations of hardware. For example, processor 20 may comprise one or more processing units that share the execution of imaging system 40 and/or inspection system 50. Similarly, memory 22 can comprise any combination of various types of read only, read/write, fixed, portable, volatile, nonvolatile, etc., computer-readable mediums and/or devices. Further, I/O interface 24 can comprise any system for exchanging information with one or more I/O devices 28, which in turn provide an interface (e.g., a communications port, a wireless communications system) with one or more other computing systems and/or an interface (e.g., a pointing device, a display, etc.) with user 12. It is understood that radiation capture system 30 and/or visible capture system 32 can include the same components (e.g., processor, memory, I/O interface, etc.) as shown for computing device 14. These components have not been separately shown and discussed for brevity.

In any event, user 12 can utilize imaging system 40 to obtain and manage radiation and/or visible light image(s) for object 16. To this extent, imaging system 40 is shown including an acquisition system 42 for obtaining radiation and/or visible light image(s) of object 16, an enhancement system 44 for generating an enhanced image of object 16 based on the radiation and/or visible light image(s), a display system 46 for displaying an image to user 12, a fusion system 48 for generating an object image based on the radiation and visible light image(s), and a management system 49 for managing the various image(s) for object 16. Similarly, user 12 can utilize inspection system 50 to perform an inspection of object 16 using the radiation and/or visible light image(s). To this extent, inspection system 50 is shown including an analysis system 52 for determining a situation based on the radiation image(s), a processing system 54 for generating object data based on the radiation image(s), and an action system 56 for performing an action in response to the situation.

Operation of each of the systems is discussed further below. However, it is understood that some of the various systems shown in imaging system 40 and inspection system 50 can be implemented independently, combined, and/or implemented on another computing system. For example, inspection system 50 could be implemented on a separate computing system from imaging system 40. To this extent, imaging system 40 could be implemented on radiation capture system 30 and/or a computing system that includes both radiation capture system 30 and visible capture system 32. Additionally, it is understood that some of the systems and/or functionality may be partially implemented, not implemented, or additional systems and/or functionality may be included within system 10.

As noted above, one embodiment of the invention provides a non-visible radiation imaging system. To this extent, radiation capture system 30 could be implemented on a sensor head unit that can be attached to computing device 14. For example, FIGS. 2A–B show alternative views of an illustrative PDA 14A and sensor head 30A. As shown in FIGS. 2A–B, sensor head 30A can mount to PDA 14A such that it can be operated as a physical extension of PDA 14A. In one embodiment, the mounting system can include a connector (male) that can mate with a communications slot (female) included on PDA 14A to enable communications between sensor head 30A and one or more systems on PDA 14A, such as imaging system 40 (FIG. 1). It is understood that PDA 14A and sensor head 30A are only illustrative, and the invention provides various alternative embodiments as will be recognized by one in the art.

Alternatively, radiation capture system 30 can be included as part of computing device 14, which is manufactured as a handheld non-visible radiation imaging system. FIG. 3 shows an illustrative handheld non-visible radiation imaging system 60 ("handheld system") according to one embodiment of the invention. Various aspects of the invention will be discussed with reference to handheld system 60. However, it is understood that some or all of the functionality could be implemented apart from handheld system 60. In any event, referring to FIGS. 1 and 3, handheld system 60 is shown imaging a building 70, and can include the various elements shown and described for computing device 14 together with radiation capture system 30. Further, handheld system 60 is shown including an objective lens 62 and a digital display 64. To this extent, handheld system 60 can be operated by user 12 in a manner similar to digital cameras that are widely known for generating images from visible light.

In particular, user 12 can request, via an I/O device 28 such as a button, that acquisition system 42 obtain a radiation image. Alternatively, acquisition system 42 could automatically determine a set of conditions (e.g., a change in temperature, a movement, etc.) that indicate that a radiation image is desired. In either case, acquisition system 42 can instruct radiation capture system 30 to generate the radiation image, which in turn can obtain a digital radiation image 72 of building 70. Radiation capture system 30 can provide digital radiation image 72, which is shown enlarged adjacent to handheld system 60, to display system 46 for displaying to user 12 via digital display 64. However, it is understood that various alternatives are possible. For example, a display could be included in an eyepiece, the radiation image could comprise an analog image that is subsequently converted to a digital data format, etc.

In operation, objective lens 62 allows the desired non-visible radiation to pass there-through, thereby enabling radiation capture system 30 to generate the corresponding radiation image 72. Acquisition system 42 can enable user 12 to adjust and/or automatically adjust one or more aspects of the generation of radiation image 72. For example, acquisition system 42 can adjust a temperature central point, a temperature range, a contrast, a color range to be used, an effective shutter speed, a number of images acquired per second, and the like. Further, radiation capture system 30 can comprise various devices/sensors that assist in the generation of radiation image 72. For example, radiation capture system 30 can comprise an illumination device, an ultrasonic sensor that can measure a distance and determine a field of view, etc. Additionally, one or more filters such as a high/low frequency cutoff filter, a bandpass filter, an intensity filter, etc., could be included in radiation capture system 30.

In one embodiment, the non-visible radiation comprises infrared light, and radiation capture system 30 comprises a system for obtaining an infrared light image of an object, such as building 70. To this extent, radiation image 72 can comprise an infrared light image of building 70 when the exterior temperature of building 70 is lower than the interior temperature of building 70 (e.g., building 70 is being heated). In this case, the majority of infrared light image 72 is dark, indicating these portions of building 70 are radiating a low amount of heat. However, portions of infrared light image 72 are brighter, indicating the presence of an increased amount of heat radiating from these areas. For example, door frame 74, locations of roof 76, and some window frames 78 all appear as bright locations in infrared light image 72.

As noted previously, it can be cost-prohibitive to obtain a raw infrared image having a high resolution. As a result, handheld system 60 can include an enhancement system 44 for generating an enhanced image that has a higher resolution than the raw radiation image 72. Enhancement system 44 can implement one or more of various solutions for generating the enhanced image. For example, one or more of various interpolation/enhancement solutions, such as bilinear and/or bicubic resampling, can be applied to radiation image 72 to generate the enhanced image, as is known in the art. Other image enhancement solutions that can be implemented by enhancement system 44 include noise filtering and reduction, multiple pixel sample averaging, interpolation and super-resolution enhancement through multiple or single image means, image averaging or subtracting, Weiner filters, Kalman filtering of multiple readings, etc. Subsequently, enhancement system 44 can provide the enhanced image to display system 46 for display to user 12.

Figure 4B:
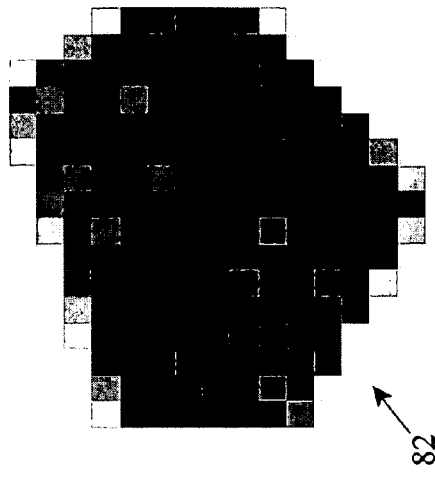
FIGS. 4A–C show various images of a building according to one embodiment of the invention.
Figure 4C:
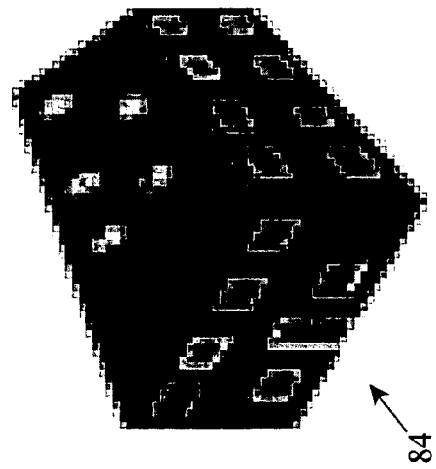
Figure 4A:
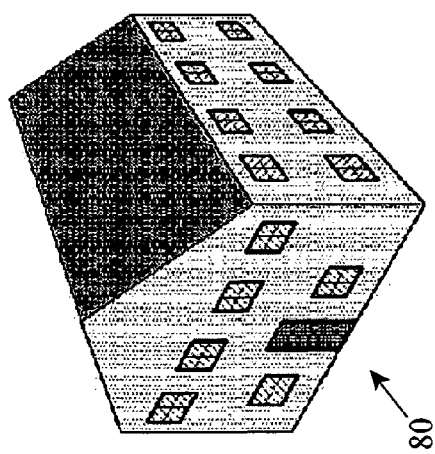

In any event, FIGS. 4A–C show various images of building 70 (FIG. 3) according to one embodiment of the invention. In particular, FIG. 4A shows a visible light image 80 having a resolution of approximately 320×320 pixels, while FIG. 4B shows an infrared light image 82 having a resolution of approximately 16×16 pixels. As can be seen, while numerous features of building 70 can be distinguished in FIG. 4A, few, if any, features can be distinguished in FIG. 4B. However, enhancement system 44 (FIG. 1) can apply one or more interpolation/enhancement solutions to infrared light image 82 to generate an enhanced image 84 shown in FIG. 4C. Enhanced image 84 has an effective resolution of approximately 64×64 pixels, enabling many of the important features of building 70 to be readily discerned.

Returning to FIGS. 1 and 3, enhancement system 44 can incorporate additional information apart from radiation image 72 in order to generate the enhanced image 84 (FIG. 4C). For example, user 12 can provide information on object 16 (e.g., building 70) to acquisition system 42. The information can include, for example, one or more characteristics of object 16. Subsequently, the one or more characteristics can be used by enhancement system 44 to generate the enhanced image of object 16. For example, one or more emissivity characteristics of object 16 can be considered when generating the enhanced image of object 16. To this extent, an object that comprises a polished metal surface that has a low emissivity value would appear cooler than an object such as a brick, which has a relatively high emissivity value, despite the two objects being the same temperature. By using the emissivity characteristics of object 16, more accurate and detailed information can be derived from an image.

Additionally, one or more characteristics of object 16 (e.g., building 70) can be automatically obtained by acquisition system 42. For example, as mentioned above, system 10 and/or handheld system 60 can further include a visible capture system 32 for obtaining a visible light image of object 16. In one embodiment, objective lens 62 focuses and allows both visible light and non-visible radiation (e.g., infrared light) to pass through for imaging by visible capture system 32 and radiation capture system 30, respectively. To this extent, acquisition system 42 can request that both systems 30, 32 obtain the respective images simultaneously, and both images can comprise substantially similar fields of view. As a result, the visible light image can be readily applied to enhance and interpret the radiation image, and vice versa.

In one embodiment, the characteristic(s) can include one or more "blobs" within the visible light image, each of which represents an object and/or component of an object in the field of view. Each blob can be identified based on the presence of one or more features, such as outlines and/or segments, found within the visible light image. To this extent, enhancement system 44 can implement any known solution for identifying these features. For example, enhancement system 44 can implement the image processing technique shown and described in the co-pending U.S. Provisional Application No. 60/572,756, filed on May 21, 2004 and entitled "System and Method for Providing Effective Security Monitoring Using Smart Sensor Fusion," and U.S. Utility patent application Ser. No. 11/003,039, filed on Dec. 3, 2004 and entitled "System and Method for Monitoring an Area," both of which are hereby incorporated herein by reference, to identify features in the image(s). With this information, enhancement system 44 can guide and improve the generation of enhanced image 84 (FIG. 4C).

Additionally, enhancement system 44 could identify the type of object/component that each blob represents. Any solution can be implemented, such as the solution described in the previously incorporated co-pending U.S. Provisional Application No. 60/572,756 and U.S. Utility patent application Ser. No. 11/003,039. For example, enhancement system 44 could identify a blob that corresponds to the hand of an individual, and a second blob that corresponds to the entire individual. Similarly, a blob for building 70 could be identified as a structure. Regardless, the identified features and/or type of object, together with information on various attributes of the features and/or type of object, can be used as a template to guide the generation of enhanced image 84 (FIG. 4C). For example, when an object is identified as a human, a human figure can be drawn in the detected pose to the limit of the enhanced resolution and the expected heat pattern of a human can be used to determine how to fully render the object.

Figure 5:
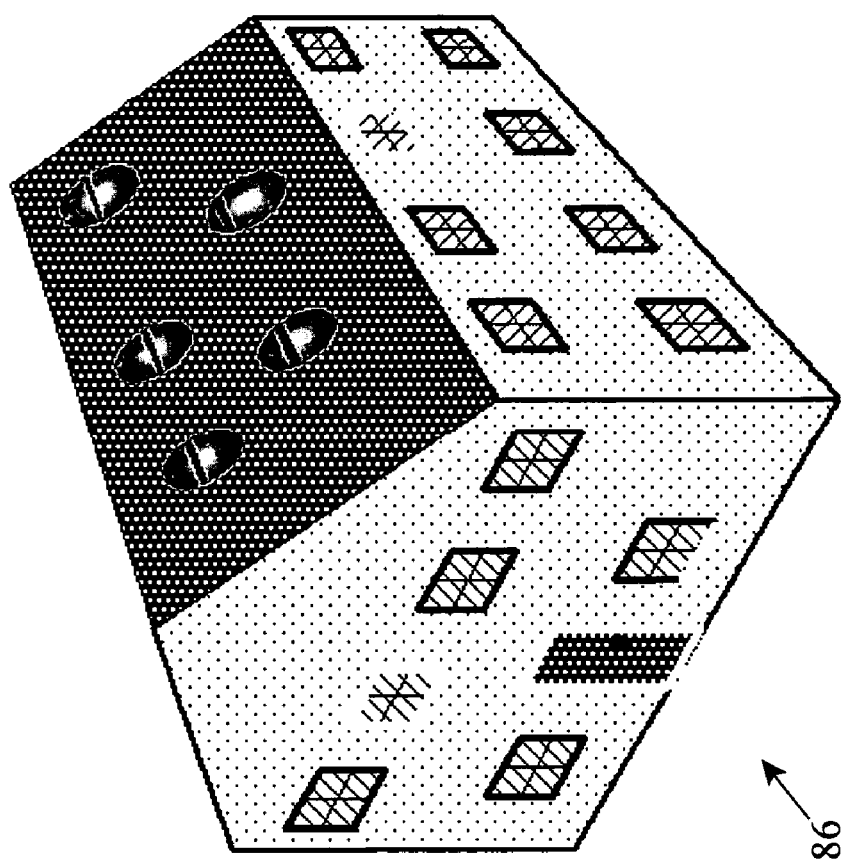
FIG. 5 shows an illustrative object image that is generated based on a visible light image and a non-visible radiation image.

Still further, imaging system 40 can include a fusion system 48 for generating an object image for object 16 that is based on visible light image 80 (FIG. 4A) and radiation image 74. To this extent, fusion system 48 can fuse visible light image 80 and either the raw radiation image 74 or enhanced image 84 (FIG. 4C) that is generated based on radiation image 74. In any event, the fused image can be provided to display system 46 for display to user 12. In one embodiment, fusion system 48 can combine elements of visible light image 80 and radiation image 74 in such a manner that the object image is readily recognizable due to visible light image 80, but includes emphasized features based on radiation image 74. For example, FIG. 5 shows an illustrative object image 86 that fusion system 48 can generate by fusing visible light image 80 and enhanced image 84. In this case, the majority of object image 86 is based on visible light image 80 while portions of enhanced image 84 are included to make several features stand out.

Fusion system 48 can implement any known solution for fusing visible light image 80 (FIG. 4A) with enhanced image 84 (FIG. 4C). For example, fusion system 48 can determine data in the enhanced image 84 having a threshold brightness, and alter the corresponding data in visible light image 80 by increasing its brightness. Further, FIG. 6 shows an illustrative optical system 90 for generating an object image based on two independent electromagnetic radiation beams. In particular, beams of radiation 92A–B corresponding to substantially coincident fields of view pass through the respective optical systems 94A–B, and are reflected by mirrors 96A–B toward a mirror prism 98. Mirror prism 98 directs each beam of radiation 92A–B such that the two beams of radiation 92A–B coincide on imaging array area 99. It is understood that many other arrangements for physical superposition, beam splitting, and other related optical arrangements could be incorporated by fusion system 48.

Returning to FIG. 1, it is understood that any number of images can be processed and/or fused. To this extent, system 10 could include capture systems for obtaining a visible light image, infrared light image and ultraviolet light image. In this case, the three images can be fused to generate an object image. For example, the object image can be of a power line, and can be used to detect the presence of any overheating (infrared light image) and/or corona discharge (ultraviolet light image) in the power line. Various other combinations of images and applications for these combinations are possible as will be recognized by those in the art.

Further, imaging system 40 can include a management system 49 that manages each of the images (e.g., radiation image, enhanced image, visible light image, object image, etc.) that can be obtained/generated by imaging system 40. To this extent, management system 49 can manage a plurality of images, and enable user 12 to selectively store, retrieve, delete, transfer, copy, rename, arrange, modify (edit), etc., one or more images, as is known in the art. In operation, management system 49 can generate various menus or the like, which can be provided to display system 46 for display to user 12 to enable the selection of a desired operation.

As previously discussed, the invention can also comprise a non-visible radiation inspection system 50 for performing an inspection of object 16. To this extent, inspection system 50 can use one or more of the images (e.g., radiation image, enhanced image, visible light image, object image, etc.) obtained by imaging system 40 in performing the inspection. In one embodiment, analysis system 52 can display the image(s) to user 12. In response, user 12 can provide inspection data to analysis system 52 and analysis system 52 can store the received inspection data together with the image(s) as a record of the inspection.

Alternatively, analysis system 52 can automatically determine a "situation" based on, for example, one or more radiation images of object 16. A situation comprises any set of attributes of object 16 that can be determined based on the one or more images. For example, the radiation image can comprise infrared light image 72 (FIG. 3) and/or object image 86 (FIG. 5). In either case, the situation can comprise a set of locations in infrared light image 72 and/or object image 86 that exceed a particular threshold intensity. When blob identification is included as discussed above, the set of locations can be identified as particular structural components of building 70 (FIG. 3) that have the threshold infrared light intensity.

In either case, analysis system 52 can use a set (one or more) of inspection parameters in performing the inspection. The set of inspection parameters can define the various attributes of object 16 that are being examined as part of the inspection. For example, the set of inspection parameters can define the threshold used when determining the set of locations discussed above. Regardless, analysis system 52 can receive the set of inspection parameters from an external system and/or user 12 can provide/modify the set of inspection parameters via one or more menus or the like. In either case, the inspection can be performed based on the set of inspection parameters and one or more of the images described above. For example, analysis system 52 can display the set of inspection parameters to user 12 who can provide the corresponding inspection data to analysis system 52. Alternatively, analysis system 52 can use the set of inspection parameters when automatically determining the situation. In this case, the inspection parameters can define each situation as a particular set of values for a relevant set of attributes.

Inspection system 50 can further include a processing system 54 for generating object data based on one or more of the images discussed above. The object data then can be displayed to user 12 instead of/in addition to one or more of the images. Further, the object data can be used by analysis system 52 in determining the situation. For example, infrared light image 72 (FIG. 3) could be processed to generate temperature data for building 70 (FIG. 3). In this case, the temperature data can be provided to analysis system 52, which can display the temperature data to user 12 and/or use the temperature data to automatically determine the situation. In one embodiment, the temperature data can be processed into a grid, sequence of dots or other shapes/lines that are colored or otherwise encoded to represent the temperature variations in infrared light image 72. The processed temperature data can then be overlaid on visible light image 80 (FIG. 4A), be used to replace and/or modify corresponding features of visible light image 80, or the like. Processing system 54 can also generate object data from one or more other sources. For example, processing system 54 could receive directional information from an acoustic system or the like, that can locate a source of a sound.

In any event, the situation and/or object data can be used to instruct acquisition system 42 on various attributes of one or more desired images for performing the inspection. For example, analysis system 52 and/or user 12 can instruct acquisition system 42 to obtain one or more images from a new location based on directional information, examine one or more features of object 16 more closely (e.g., zoom in), and the like. In response, acquisition system 42 can instruct one or more capture systems 30, 32 to adjust the corresponding field of view accordingly, and obtain the desired image(s). Subsequently, the image(s) can be provided to inspection system 50 for further analysis and/or processing.

Additionally, inspection system 50 can include an action system 56 for performing one or more actions in response to the situation determined by analysis system 52. For example, analysis system 52 could determine that a fire is starting at a particular location of object 16. In response, action system 56 can transmit an alarm to another system, contact a responder, or the like.

The invention also includes a method of inspecting object 16. To this extent, FIG. 7 shows illustrative method steps for inspecting object 16 (FIG. 1) according to one embodiment of the invention. In particular, in step S1A, a radiation image of object 16 is obtained, in step S1B, a visible light image of object 16 is obtained, and in step S1C, a set of inspection parameters is obtained. While steps S1A–C are shown occurring in parallel, it is understood that these steps can be performed in any order. However, in a preferred embodiment of the invention, steps S1A–B occur concurrently. In any event, in step S2, an object image is generated based on the radiation image and the visible light image. In step S3, object data is obtained based on the object image and/or the set of inspection parameters. In step S4, a situation is determined based on the object data, and in step S5, an action is performed in response to the situation. It is understood that these method steps shown in FIG. 7 are only illustrative of one embodiment of the invention. To this extent, various other embodiments may include additional and/or fewer steps, may perform the steps in a different order, etc.

It is understood that the invention can be incorporated into any number of applications. For example, radiation capture system 30 and/or visible capture system 32 could be attached to a helmet or otherwise mounted to the head of user 12 so that images can be obtained for display at a remote location, display on a visor/faceshield, display as part of a virtual retinal display, etc. In this case, the invention could be used to analyze the actions of user 12 during a military exercise, used to assist in firefighting, search and rescue, security, and the like.

Further, while radiation capture system 30 and visible capture system 32 have been shown and described as separate systems, it is understood that a multispectral optical system could be used to obtain an image based on radiation having wavelengths within more than one spectrum. For example, the multispectral optical system could comprise a lens composed of germanium or silver chloride, each of which is capable of refracting and focusing visible near-infrared, and infrared light over a particular range. Alternatively, one or more other materials could be incorporated. For example, diamond is transmissive through a wide band of the spectrum from ultraviolet to infrared. In this case, the multispectral optical system would enable the use of a single beam of radiation that can be directed to the corresponding imaging arrays through the use of a beam splitter, shutter mechanism, or the like.

Still further, radiation capture system 30 could comprise a plurality of imaging systems having fields of view that can be combined to generate a larger, contiguous field of view. In this case, each imaging system can concurrently generate an image, and the images can be combined to obtain a higher resolution image of the larger field of view. Using this approach, the use of smaller, less expensive, low resolution imaging arrays is possible rather than a single higher resolution imaging array.

It should be appreciated that the teachings of the present invention could be offered as a business method on a subscription or fee basis. For example, some or all of imaging system 40 (FIG. 1), inspection system 50 (FIG. 1), and/or computing device 14 (FIG. 1) could be created, maintained and/or deployed by a service provider that offers the functions described herein for customers. That is, a service provider could offer to image an object and/or perform an inspection as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Further, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, program product or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A non-visible radiation imaging system comprising:
   means for obtaining a radiation image of an object based on non-visible radiation of the object;
   means for obtaining a visible light image of the object;
   means for generating an enhanced image based on the radiation image, wherein the enhanced image has a higher resolution than the radiation image;
   means for generating an object image by fusing the visible light image with the enhanced image; and
   means for displaying at least one of the radiation image, the enhanced, or the object image.

2. The system of claim 1, further comprising means for obtaining at least one characteristic of the object, wherein the enhanced image is further based on at least one characteristic of the object.

3. The system of claim 1, wherein the enhanced image is further based on the visible light image.

4. The system of claim 1, further comprising means for managing at least one of the radiation image or the enhanced image.

5. The system of claim 1, further comprising means for performing an inspection based on the radiation image and a set of inspection parameters.

6. The system of claim 5, wherein the means for performing an inspection includes means for generating object data based on the radiation image.

7. The system of claim 5, wherein the means for performing an inspection includes means for determining a situation based on the radiation image.

8. The system of claim 7, wherein the means for performing an inspection includes means for performing an action in response to the situation.

9. A handheld imaging system comprising:
means for obtaining an infrared light image of an object;
means for obtaining a visible light image of the object;
means for generating an object image by fusing the infrared light image and the visible light image;
means for displaying the object image; and
means for managing at least one of the infrared light image, the visible light image or the object image.

10. The system of claim 9, further comprising means for performing an inspection based on at least one of the infrared light image, the visible light image or the object image.

11. The system of claim 10, wherein the means for performing an inspection includes means for determining a situation based on the at least one of the infrared light image, the visible light image or the object image.

12. The system of claim 11, further comprising means for performing an action in response to the situation.

13. The system of claim 9, further comprising means for generating temperature data based on the infrared light image.

14. A non-visible radiation inspection system comprising:
means for obtaining a radiation image of an object being inspected based on non-visible radiation of the object;
means for obtaining a visible light image of the object;
means for generating an enhanced image based on the radiation image, wherein the enhanced image has a higher resolution than the radiation image;
means for generating an object image of the object by fusing the radiation image and the visible light image; and
means for determining a situation based on the radiation image and a set of inspection parameters.

15. The system of claim 14, further comprising means for displaying the radiation image.

16. The system of claim 14, further comprising means for managing the radiation image.

17. The system of claim 14, further comprising means for generating object data based on the radiation image, wherein the situation is further based on the object data.

18. The system of claim 14, further comprising means for performing an action in response to the situation.

19. A method of inspecting an object, the method comprising:
obtaining a radiation image of the object based on non-visible radiation of the object;
obtaining a visible light image of the object;
generating an object image of the object by fusing the radiation image and the visible light image; and
performing the inspection based on the object image and a set of inspection parameters.

20. The method of claim 19, wherein the performing step includes:
displaying the object image to a user; and
receiving inspection data from the user.

21. The method of claim 19, wherein the performing step includes automatically determining a situation based on the object image.

22. The method of claim 21, wherein the performing step further includes automatically performing an action in response to the situation.

23. The method of claim 19, wherein the performing step includes generating object data for the object based on at least one of the radiation image or the object image.

* * * * *